(12) United States Patent
MacDaniel et al.

(10) Patent No.: US 7,827,117 B2
(45) Date of Patent: Nov. 2, 2010

(54) SYSTEM AND METHOD FOR FACILITATING ONLINE EMPLOYMENT OPPORTUNITIES BETWEEN EMPLOYERS AND JOB SEEKERS

(76) Inventors: Aaron MacDaniel, 5 Weitz St., Apt. #3, Allston, MA (US) 02134; Joseph Sikare, 10 Florence St., Apt. #600, Malden, MA (US) 02148

( * ) Notice: Subject to any disclaimer, the term of this patent is extended or adjusted under 35 U.S.C. 154(b) by 435 days.

(21) Appl. No.: 11/899,943

(22) Filed: Sep. 10, 2007

(65) Prior Publication Data

US 2009/0070126 A1    Mar. 12, 2009

(51) Int. Cl.
    *G06Q 10/00*   (2006.01)
(52) U.S. Cl. .................................................. 705/321
(58) Field of Classification Search ............... 705/1.1, 705/321
    See application file for complete search history.

(56) References Cited

U.S. PATENT DOCUMENTS

| | | | | |
|---|---|---|---|---|
| 5,978,768 A | * | 11/1999 | McGovern et al. | 705/1.1 |
| 2001/0034630 A1 | * | 10/2001 | Mayer et al. | 705/7 |
| 2004/0255237 A1 | * | 12/2004 | Tong | 715/501.1 |

* cited by examiner

*Primary Examiner*—Jamisue A Plucinski
*Assistant Examiner*—Maame Ofori-Awuah
(74) *Attorney, Agent, or Firm*—Lambert & Associates; Adam J. Bruno; Gary E. Lambert

(57) ABSTRACT

A system and method for facilitating access to online employment opportunities between employers and job seekers, wherein the system will rank both job seekers and employers based on a predetermined points schedule, and wherein the system will automatically match job seekers with job listings, and employers with job seekers, and finally wherein employers will purchase contact information for job seekers they are interested for a system-determined price based on job seeker's rank within the system.

6 Claims, 12 Drawing Sheets

Fig. 6

SYSTEM AND METHOD FOR FACILITATING ONLINE EMPLOYMENT OPPORTUNITIES BETWEEN EMPLOYERS AND JOB SEEKERS

BACKGROUND OF THE INVENTION

1. Field of the Invention

This invention relates generally to the field of the online job search market, and more particularly to a system and method for employers to post employment opportunities, for job seekers to post resumes, wherein the employment opportunities and/or resumes are ranked depending on the amount of viewing by an individual.

2. Description of the Related Art

The competitive nature of the online employment services market is a clear indicator that the market is ready for a new approach. The transition of employment services from agencies and recruiters to the Internet is a natural result of a "self-serve" market economy, and this is evident from the rapid growth of the major online job sites. Also, many signs point toward growth in the economy which stimulates a company's hiring activity along with employees seeking better employment. Coupled together, it is a reasonable conclusion that online job sites will play an expanding role in the job seeker's and employer's needs for connecting.

However, currently the ratio of resumes to online job postings is greater than 50:1, with numerous sites proclaiming of the millions of resumes stored on their sites. Furthermore, resumes are difficult to decode and many hiring agents usually funnel data into a standardized application, leaving many applicants unable to distinguish themselves from others. In addition, the rise of software filtering programs removes any personal style left in an applicant's resume.

On the flip side, from the job seeker's perspective, applying for jobs online can be a daunting task, with the expectation that nothing will come of it. The impersonal nature of automatic email responses along with non-existent communication from job postings can provide a false sense of hope; even though it is likely the hiring agent never saw the job seeker's resume.

Furthermore, the online job search market is enormous, with millions of people each year posting resumes and job opportunities online at such popular sites as Monster.com, Careerbuilder.com, Linkedin.com and Craigslist.org. However, most of these solutions consist of simple searching tools, wherein they are simply searching an individuals resume for keywords that match an employer's search, or alternatively, searching an employers job opportunity that match a job seeker's search. Therefore, even though an individual may locate a perspective employee or employment opportunity, there is much human interaction that is still needed to filter the results of the above-referenced search to determine whether an adequate fit exists.

The amount of time necessary for an individual to spend on this second layer of filtering can be daunting. Further complicating this process is the fact that it is very difficult sometimes to find the right candidate for a job opening. Some candidates that an employer locates may already have a job, or are no longer interested in the posted employment opportunity, even though a candidate's resume stays on the job site. These are very common concerns of any employer looking for potential employees and can be described as "SEARCHING PROBLEMS".

In addition to the frustration employers may encounter in finding the right candidate, job seekers often find these job sites just as tedious and difficult to navigate. Often time's job seekers find it is difficult to describe them simply with a resume. In addition, searching for a job opportunity based on only using keywords tends to be a fruitless endeavor since it is difficult to locate an ideal job opportunity based on a single keyword search. Currently, there is no system that will present job matches that are likely correct for a job seeker based on past searches and an individual's interest and this can be described as "SEEKING PROBLEMS".

Finally, the current solutions are extremely expensive for employers when they wish to find candidates. On average, most sites charge over $1000.00 a month for search access, and approximately $400.00 to simply post a job opening. As a result, most employers will find this too expensive after a cost-benefit analysis reveals there are not enough quality candidates identified from an employers search as a result of the "SEARCHING PROBLEMS" described above. Therefore, employers could be spending thousands of dollars in search fees for candidates that don't interest them at all and this can be described as "PRICING PROBLEMS".

The following patents are examples of current solutions in matching employers with job seekers, yet still are not able to effectively and efficiently match the best candidate with the best job opening.

U.S. Pat. App. No. 2001/0034630 to Mayer et al. discloses a method and system for matching candidates to available job positions implemented in a network environment such as the Internet. Candidates can search for available job openings and store their personal profiles in a database maintained by the web server. Employers may conduct searches of the candidate profile database to find one or more candidates who match particular job criteria.

U.S. Pat. App. No. 2004/0128282 to Klienberger et al. discloses a method for computer searching, that includes receiving an initial data set from a data set source then (1), prioritize searches based on the user's preferences, (2), deselecting data items with low priority (3) and displaying results (4). In this invention the user's preferences are determined by information acquired by previous interactions with the search engine and demographic information.

U.S. Pat. App. No. 2001/049674 to Talib et al. discloses a method and systems for efficient employment recruiting. This invention relates to searching a data collection of employment information in a way that makes it easy to search using multiple independent hierarchical category taxonomies of the data collection.

U.S. Pat. App. No. 2004/0172417 to Hartman et al. discloses a resume storage and retrieval system over the Internet where summaries of resumes are broken down into searchable fields. Potential employers are then able to search for employment candidates via these summaries of searchable fields over the World Wide Web or other connectivity services.

U.S. Pat. App. No. 2006/0178896 to Sproul discloses a new way of connecting job seekers with employers that will change the way traditional employment searches are conducted by both parties. The aim is to subordinate the importance of a resume behind or below a more objective matching of a person's personality traits with the desired traits for an available position. This match, along with a set of basic qualification criteria, will be the foundation of the invention's ability to improve both the standard of employment searching and the standard of the final results.

U.S. Pat. App. No. 2006/0265268 to Hyder et al. discloses a job searching and matching system and method is disclosed that gathers job seeker information in the form of job seeker parameters from one or more job seekers, gathers job information in the form of job parameters from prospective employers and/or recruiters, correlates the information with past job seeker behavior, parameters and behavior from other job seekers, and job parameters and, in response to a job seeker's query, provides matching job results based on common parameters between the job seeker and jobs along with suggested alternative jobs based on the co-relationships and based on ratings and preferences provided by the job seeker and provides negative filtration of undesirable jobs based on job seeker input and in response to queries from the system in order to efficiently and accurately accommodate job seeker perception.

In addition Careerbuilder.com has currently launched a new service focusing on job matching technology that is three-fold in nature: (1) Scanning an individual's resume for specific keywords identified by a potential employer or job posting; (2) Remembering what a job seeker or employer has previously searched; (3) Collecting details from previous jobs that an individual has applied to. The logic behind this system is that job candidates will receive jobs that more match their interest, and from using the website more frequently the better the job matches become. However, even though the above-referenced model is the most innovative online job searching tool thus far, it still does not fully address the problem for job seekers and does not address the problem at all for employers, namely how to find the best candidates and the best jobs. On top of this, none of the current solutions take into account the activity or popularity of a job or candidate as a function of how often the particular job or candidate is viewed. The best indicator of fit for both job seeker and employer is not based on keywords, but based on how popular the particular job or candidate is from the interest of other candidates, not an individuals own actions.

SUMMARY OF THE INVENTION

The present invention, as further described herein, imparts a novel system and method for bringing together employers seeking to fill job openings and job candidates seeking full-time employment in a more cost-effective and efficient manner to enable and ensure that the best candidates are matched with the best jobs. The instant invention, as illustrated herein, is clearly not anticipated, rendered obvious, or even present in any of the prior art mechanisms, either alone or in any combination thereof. Therefore, what is required is a system and method to bring employers and job candidates together through a job searching website, wherein individuals are able to view the popularity or activity of a job, in addition to addressing and solving the prior art problems of "SEARCHING", "SEEKING" and "PRICING".

The primary object of the present invention is to provide a new system and method for effectively bringing together employers and job seekers to assist employers in finding the best candidates for their job openings, and for assisting job candidates in finding the best positions available.

Another object of the present invention is to provide a system and method for effectively bringing together employers and job seekers, wherein potential job candidates are given ranks based on the number of times and types of viewing by employers, thereby designating some job candidates as a "rising star".

Another object of the present invention is to provide a system and method for effectively bringing together employers and job seekers, wherein employment opportunities are given ranks based on the number of times and types of viewing by job seekers, thereby designating some employment opportunities as more sought after than others.

Another object of the present invention is to provide a system and method for effectively bringing together employers and job seekers, wherein employers will pay a small fee to post a job opportunity, after which employers would "Pay-Per-Contact" for job seekers they were interested in learning more about.

Another object of the present invention is to provide a system and method for effectively bringing together employers and job seekers, wherein employers are able to search a job candidate database for no cost, enabling employers to view brief descriptions of job seekers without viewing or accessing their contact information.

Another object of the present invention is to provide a system and method for effectively bringing together employers and job seekers, wherein an "auction" type pricing model will be used for employers searching for job candidates, such that contacting highly desired employees will demand a premium over less desired employees.

Another object of the present invention is to provide a system and method for effectively bringing together employers and job seekers, wherein job seekers are able to post personal information in addition to their resume to allow employers to view recommendations, videos and pictures. This invention complements the "Pay-Per-Contact" pricing model where an employer would want to know as much information about a job seeker as possible before they buy their contact information.

There has thus been outlined, rather broadly, the more important features of the system and method for bringing together employers and job candidates, in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

FIG. 6 illustrates an example of a detailed job description page that contains the employer's profile.

DETAILED DESCRIPTION OF THE PREFERRED EMBODIMENTS

The instant invention discloses a novel system and method for bringing together employers and job candidates. Both employers and job candidates are able to remotely access the system via the internet and a local terminal as known in the modern computer arts. Upon accessing the system employers are able to upload information about a job opening for potential job candidates to view and apply for, and simultaneously search the system's database for information about job candidates that match the experience and qualifications of the job opening. Conversely, job candidates are able to upload their resume and personal information which is contained in a "webzume" (discussed in further detail below), and simultaneously search the system's database for information about job openings that match the individual candidates experience.

The instant invention describes a professional networking site. There will be two different types of users for this system: Job Seekers and Employers; the function of each user will be substantially similar. Both job seekers and employers can create custom personal home pages in the system to describe various aspects of their professional career, company and other relevant details. Furthermore, both users have the ability to edit and update their personal home pages. Specifically, for job seekers, their custom home page will serve as a web based live resume, referred to as a "webzume"; for employers, their custom home page will serve as the primary means to describe their company, attract potential employees and post available jobs openings.

Figure 1:
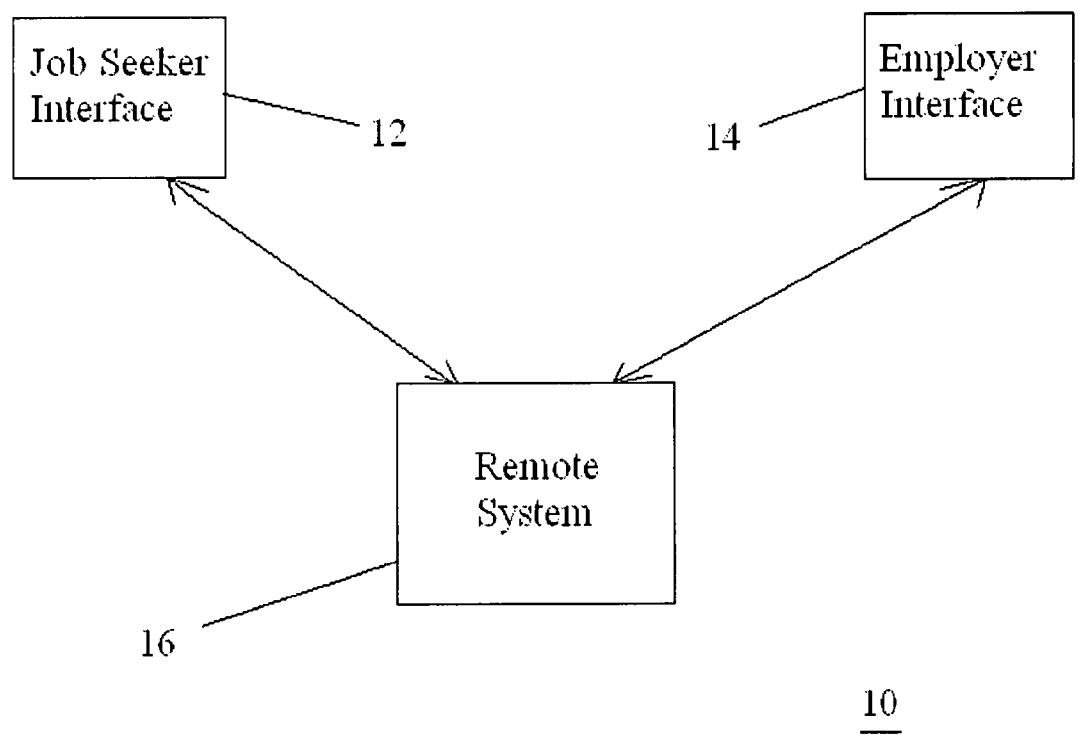
FIG. 1 is a diagrammatic illustration of a computerized infrastructure network required to accomplish the goals according to an embodiment of the system.

FIG. 1 illustrates an overview of the instant invention having a system 10 having a job seeker interface 12, an employer interface 14 and a remote system 16. Both the job seeker interface 12 and the employer interface 14 are each disposed with access to the internet. Furthermore, the remote system 16 provides storage for a multiplicity of databases comprising job seeker information and employer information, and software interaction between the job seeker interface 12 and the employer interface 14, allowing for a job seeker to access the database for employer information, and allowing an employer to access the database for job seeker information.

The remote system 16 with readable software is preferably maintained by a service provider as known in the computer arts. Preferably the job seeker interface 12 and employer interface 14 each are a personal computer with access to the internet. However, the job seeker interface 12 and employer interface 14 can be any Internet-enabled device or means for remote access to the Internet, including but not limited to cellular phones, blackberries or personal digital assistants ("PDA").

Figure 2:
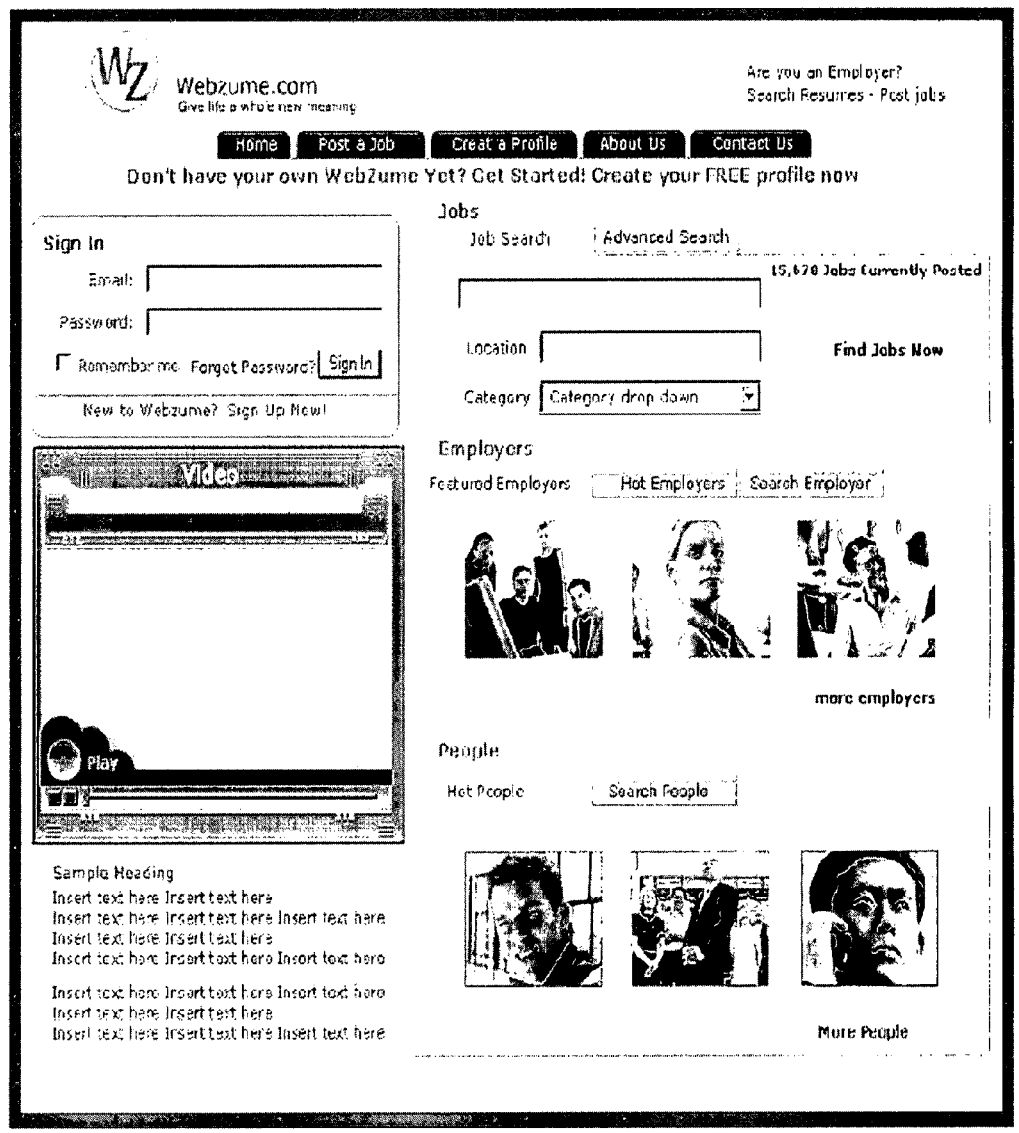
FIG. 2 illustrates an example of the main log-in page of the system, wherein either a job seeker or employer can access the system by entering the user's electronic mail address and their password.

FIG. 2 illustrates an example of the main log-in page 20 of the system, wherein either a job seeker or employer can access the system by entering the user's electronic mail address and their password. A job seeker or employer that is new to the system can create their own personal account. In creating the personal account, the user will be required to input basic bibliographic information. Once a user has created their personal account, the job seeker or employer will be able to access the system by entering their email address and a self-generated password from a remote location that is connected to and communicates with the World Wide Web.

Figure 3:
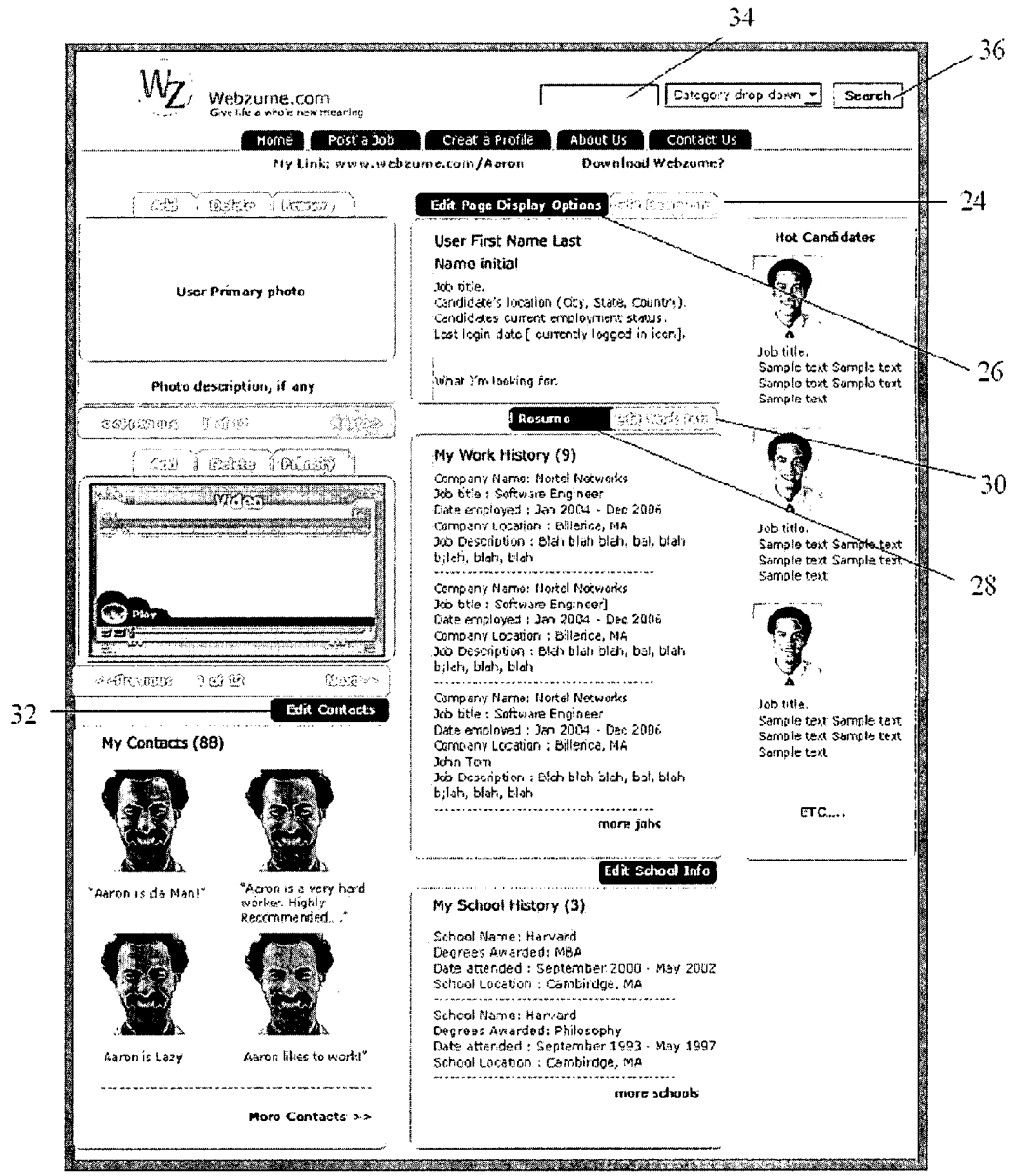
FIG. 3 illustrates an example of a custom personal home page of a job seeker after they have logged into the system.

FIG. 3 illustrates an example of a custom personal home page 22 of a job seeker after they have logged into the system 10. Within the home page 22, a job seeker will be able to perform a variety of functions to make the page 22 unique to the individual user. Within the personal home page 22, the job seeker will be able to input all necessary "personal" data including, but not limited to work history, education, contacts, and media files including photos and video. All of this information will be searchable and viewable by employers. From the job seekers personal home page 22 a user will be able to select the edit basic info tab 24 and modify the user's personal information such as location, contact information and what they are looking for in terms of employment. Additionally, a user will be able to change the display of their personal home page 22 by selecting the edit page display tab 26, wherein the job seeker can modify the background of home page 22, including the background color, the link color and font, as well as uploading image files such as .jpg, .gif, or .png to display as their background image. The job seeker will select the edit resume tab 28 to modify and update their resume, and will select the edit work info tab 30 to modify and update their work history for potential employers to view. The job seeker will also be able to add and delete videos and pictures on their home page 22. Furthermore, the job seeker can select the edit contacts tab 32 to add other job seekers on the system to their home page 22 allowing them to become part of their network. Finally, a job seeker can search the database of employer information and available jobs by entering specific keywords into the search field box 34 and by selecting the search tab 36.

Figure 4:
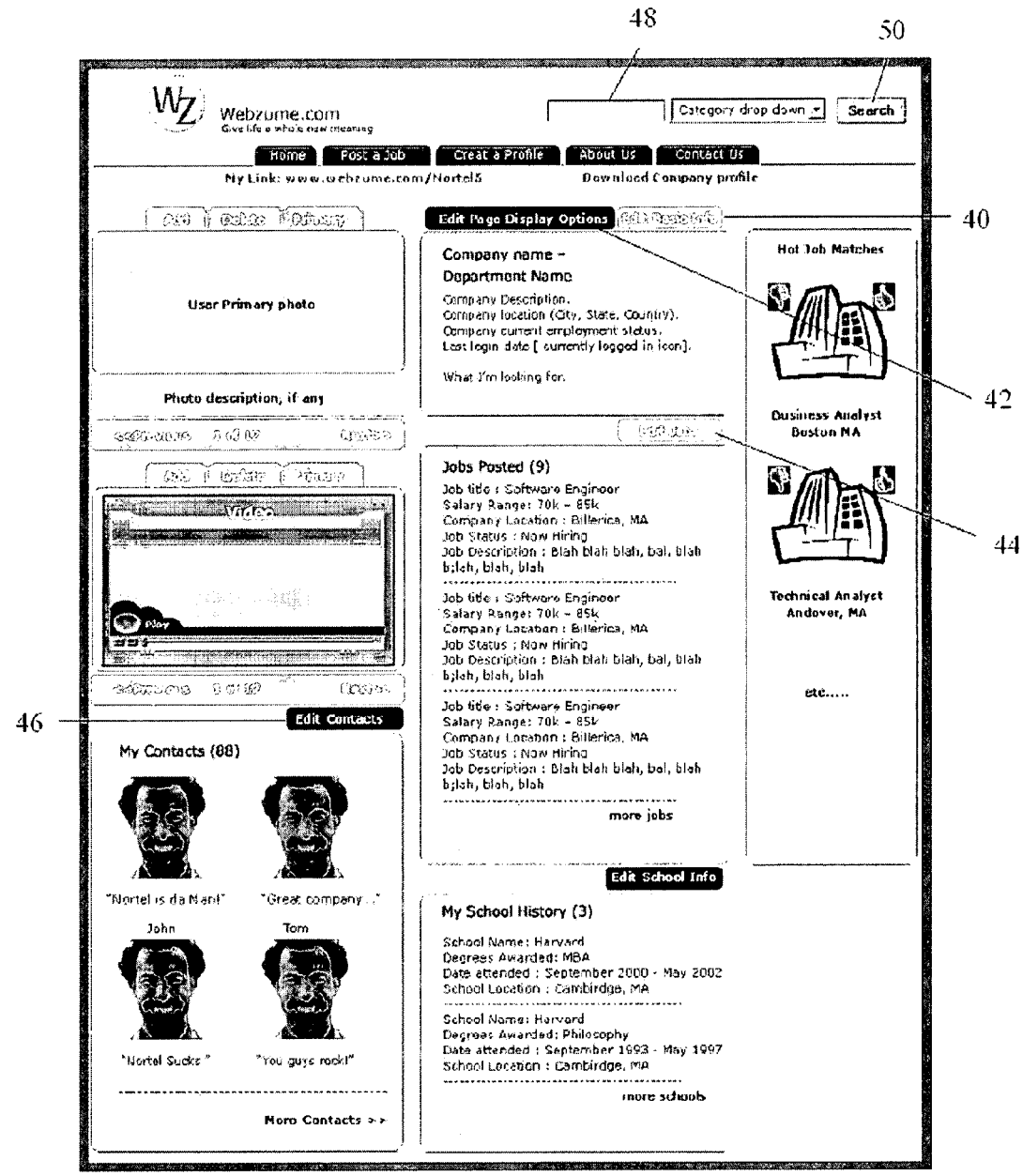
FIG. 4 illustrates an example of a custom personal home page of an employer after they have logged into the system.

FIG. 4 illustrates an example of a custom personal home page 38 of an employer after they have logged into the system 10. Within the home page 38, an employer will be able to perform a variety of functions to make the page 38 unique to the individual user. Within the personal home page 38, the employer will be able to input all necessary "personal" data including, but not limited to a description of the employer, company information, photos and videos. All of this information will be searchable and viewable by job seekers. From the employers personal home page 38 a user will be able to select the edit basic info tab 40 and modify the users personal information such location, contact information and what they are looking for in terms of job candidates. Additionally, a user will be able to change the display of their personal home page 38 by selecting the edit page display tab 42, wherein the employer can modify the background of their home page 38, including the background color, the link color and font, as well as uploading image files such as .jpg, .gif, or .png to display as their background image. The employer will select the edit jobs tab 44 to add and update available job openings, along with providing a description of the job, the location and salary. The employer will also be able to add and delete videos and pictures on their home page 38. Furthermore, the employer can select the edit contacts tab 46 to add other employers on the system to their home page 38 allowing them to become part of their network. Finally, an employer can search the database of job candidate information and available job candidates by entering specific keywords into the search field box 48 and by selecting the search tab 50.

Figure 5:
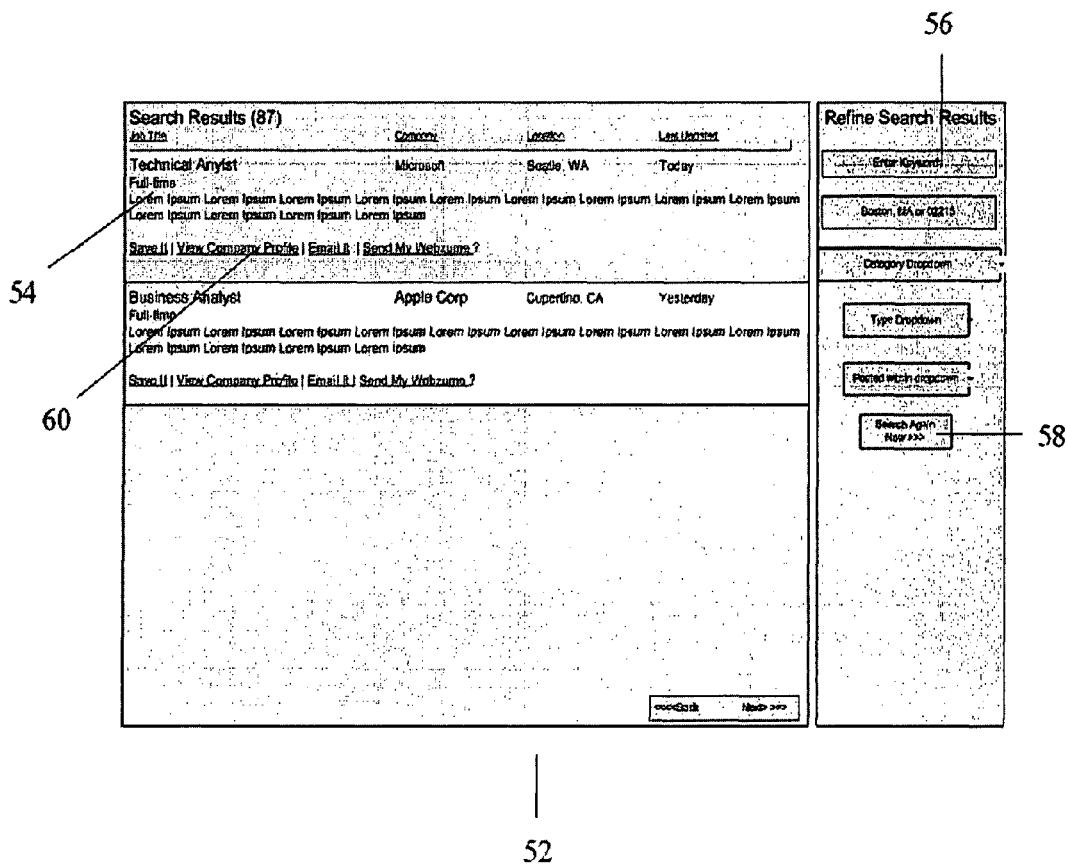
FIG. 5 illustrates an example of a search results page that displays after a job seeker has entered information into the search field box and selected the search tab.

FIG. 5 illustrates an example of a search results page 52 that displays after a job seeker has entered information into the search field box 34 and selected the search tab 36. Within the search results page 52, there is a listing of all the available jobs in the database of the system, and contained in each job listing 54, there is a listing of the job title, company, location and a brief description of the job and the roles and responsibilities associated with the job. From the search results page 52, a job seeker can either refine their search results by inputting new data by selecting the enter keywords tab 56, and then by searching again by selecting the search again now tab 58. In addition, a job seeker may select the view company profile tab 60 to view detailed information about the employer and the job opening.

Figure 6:
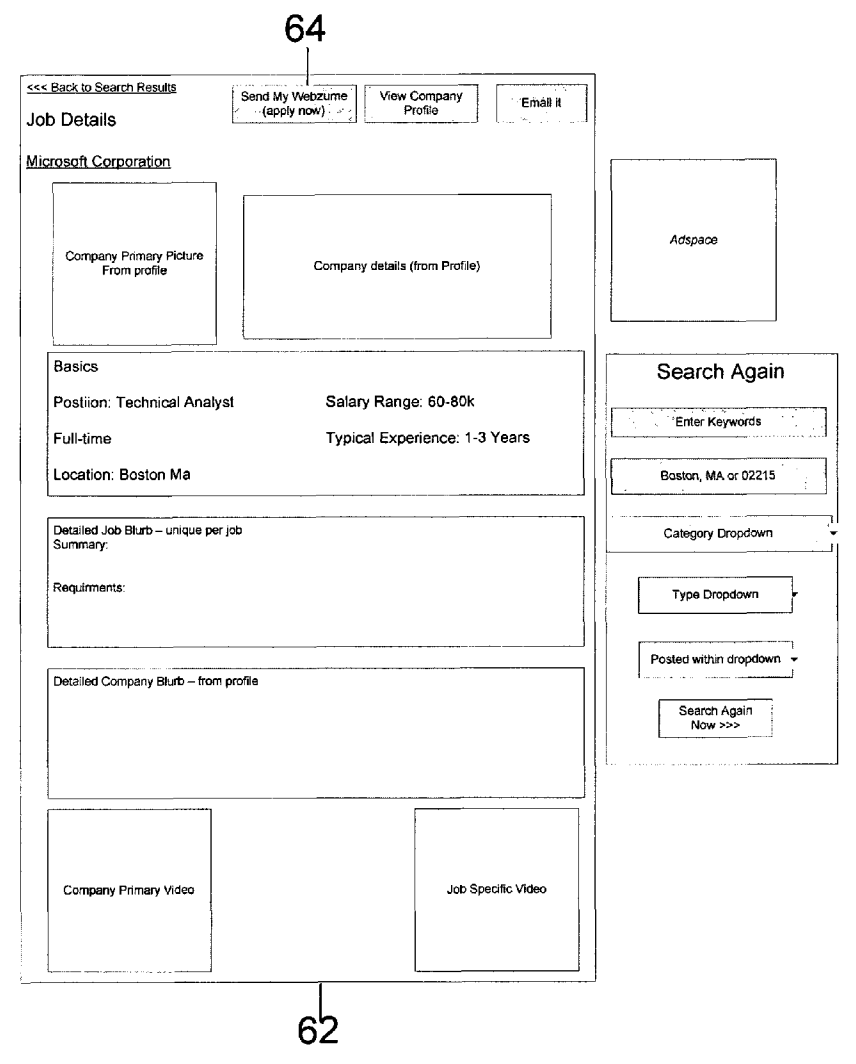

FIG. 6 illustrates an example of a detailed job description page 62 that contains the employer's profile. The job seeker can view more details about the job opening including the salary associated with the position and the experience required. If the job seeker wishes to apply for the job, by selecting the send my webzume tab 64, a "webzume" will be sent to the employer. A "webzume" is a capture of the job seekers personal home page 22 that essentially is a "super screenshot" that can be sent in several different formats, including but not limited to a .PDF, .jpg, .gif, or .png image file, or the "webzume" may be as complex as a FLASH, word document, or any other multi-media capture of all the elements on the job seekers personal home page 22. The "webzume" replaces the traditional resume that employers receive from job seekers, in that the "webzume" comes alive with media files such as pictures, videos and audio files. The job seekers personal home page 22 which is used to create the "webzume" is a unique blend of traditional resume information such as job experience and education along with non-traditional information such as pictures, audio and video files which brings to life a job seeker's resume and allows the employer to get to know the job seeker on a more personal level and beyond the information solely contained on a resume.

In addition to the instant invention providing a forum for job seekers and employers to come together, the system also provides a statistical ranking of job seekers based upon the amount of times viewed by employers, and likewise a statistical ranking of job listings based upon the amount of times viewed by job seekers.

Figure 7:
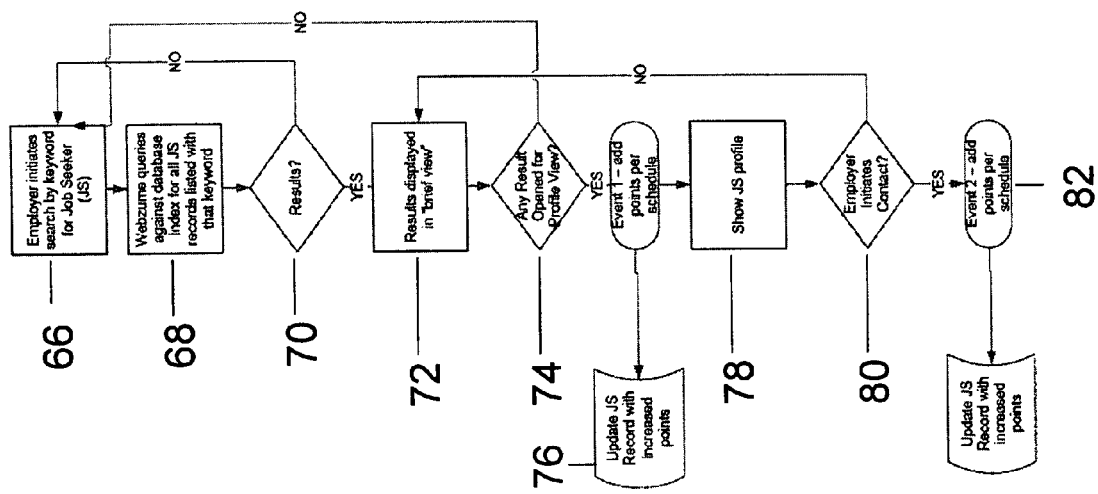
FIG. 7 is a process flow diagram illustrating how job seekers will be ranked in the present system, such that job seekers will receive a higher score based on several decision events by employers.

FIG. 7 illustrates a process system flow chart detailing how job seekers will be ranked in the system. In general, job seekers will receive a higher score based on several decision events, with each event adding to the total points and with the second event worth more than the first event. In the instant invention, all job seekers will be given a rank to be stored in the database as an integer number. Although all job seekers will be given a ranking, neither the job seekers nor employers will see this rank number. In summary, employers will be able to search for job seekers using the traditional methods described above by inputting specific keywords, or they may upon receiving the search results, decide to sort the results based on the statistical ranking in the system. The rank number given to job seekers is determined by how many times and what type of views a job seeker receives from an employer. An example of this ranking system is as follows:

EVENT 1: Employer selects a more detailed view of a job seeker after the employer has inputted specific keywords and a search results page has been produced.

EVENT 2: Employer selects to contact the job seeker about a job opening that the employer has available

| | |
|---|---|
| EVENT 3: | Job seeker receives no Event 1 in a day |
| EVENT 4: | Job seeker receives no Event 2 in a week |
| EVENT 5: | Job seeker receives no Event 1 in a week |
| EVENT 6: | Job seeker receives no Event 2 in a month |

Each of the above associated events will have a point value assigned that will factor into determining the overall ranking of a job seeker. An example of this points system is as follows:

| | |
|---|---|
| EVENT 1: | +1 Point |
| EVENT 2: | +10 Points |
| EVENT 3: | −1 Point |
| EVENT 4: | −5 Points |
| EVENT 5: | −5 Points |
| EVENT 6: | −20 Points |

Therefore, each job seekers rank will be determined by the total points they have accumulated based on the above-described events along with providing rankings based on keywords, wherein each keyword inputted by the employer will have a rank associated with it, thereby providing the most accurate rank results by keyword. Job seekers with higher point totals will be considered "hot" and will be shown as such in the job seekers personal home page 22. Job seekers with a predetermined number of points accumulated in the most recent three day period will be considered a "rising star" and will be shown as such in the job seekers personal home page 22.

At step 66, an employer after logging into the system will input specific keywords that match the type of job seeker they want for an available job. At step 68, the system searches the database index for all job seekers that contain the specific keywords on their personal home page 22. At step 70, the search results page will be generated; if no job seekers are found, then the employer will return to step 66 and input new keywords. However, if search results are generated at step 70, then the employer will be able to view brief views of job seekers at step 72. At step 74, the employer decides whether or not to select one of the job seekers for a more detailed view, however if no job seekers are selected, then the employer will return to step 66 and input new keywords. When an employer selects a job seeker at step 76, above-described Event 1 will have occurred, generating a specific number of points for the job seeker. At step 78, by selecting a job seeker, the employer will be able to view job seekers profile, specifically the custom home page 22. At step 80, the employer must make a decision as to whether they wish to initiate contact with the job seeker. If the employer decides to initiate contact, then at step 82, above-described Event 1 will have occurred, generating a specific number of points for the job seeker, however, if the employer decides not to initiate contact, then the employer will return to step 68 to input new keywords for another search.

Figure 8:
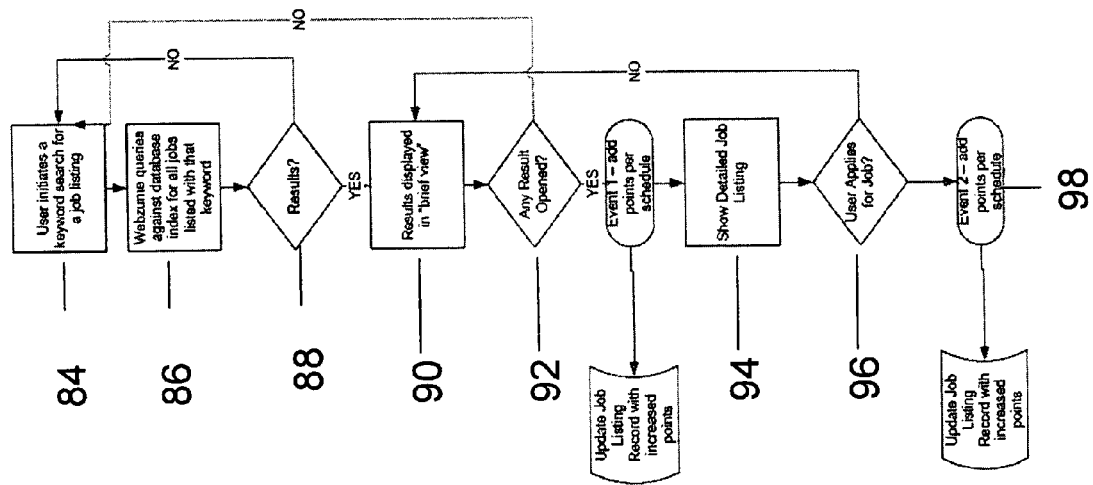
FIG. 8 is process flow diagram illustrating how job listings will be ranked in the present system, such that job listings will receive a higher score based on several decision events by job candidates.

FIG. 8 illustrates a process system flow chart detailing how job listings will be ranked in the system. In general, job listings posted by employers will receive a higher score based on several decision events, with each event adding to the total points and with the second event worth more than the first event. In the instant invention, all job listings will be given a rank to be stored in the database as an integer number. Although all job listings will be given a ranking, neither the job seekers nor employers will see this rank number. In summary, job seekers will be able to search for job listings/employers using the traditional methods described above by inputting specific keywords, or they may upon receiving the search results, decide to sort the results based on the statistical ranking in the system. The rank number given to job listings is determined by how many times and what type of views a job listing/employer receives from a job seeker. An example of this ranking system is as follows:

EVENT 1: Job seeker selects a more detailed view of a job listing/employer after the job seeker has inputted specific keywords and a search results page has been produced.

EVENT 2: Job seeker selects to apply for the job opening that the employer has available.

| EVENT 3: | Employer receives no Event 1 in a day |
| EVENT 4: | Employer receives no Event 2 in a week |
| EVENT 5: | Employer receives no Event 1 in a week |
| EVENT 6: | Employer receives no Event 2 in a month |

Each of the above associated events will have a point value assigned that will factor into determining the overall ranking of a job listing/employer. An example of this points system is as follows:

| EVENT 1: | +1 Point |
| EVENT 2: | +10 Points |
| EVENT 3: | −1 Point |
| EVENT 4: | −5 Points |
| EVENT 5: | −5 Points |
| EVENT 6: | −20 Points |

Therefore, each job listing/employer's rank will be determined by the total points they have accumulated based on the above-described events, along with providing rankings based on keywords, wherein each keyword inputted by the job seeker will have a rank associated with it to providing the most accurate rank results by keyword. Job listings/employers with higher point totals will be considered "hot" and will be shown as such in the employer's personal home page 38. Job listings/employers with a predetermined number of points accumulated in the most recent three day period will be considered a "rising star" and will be shown as such in the job seekers personal home page 38.

At step 84, a job seeker after logging into the system will input specific keywords that match the type of job they want. At step 86, the system searches the database index for all job listings/employers that contain the specific keywords on their personal home page 38. At step 88, the search results page will be generated; if no job listings are found, then the job seeker will return to step 84 and input new keywords. However, if search results are generated at step 86, then the job seeker will be able to view brief views of job listings/employers at step 90. At step 92, the job seeker decides whether or not to select one of the job listings for a more detailed view, however if no job seekers are selected, then the job seeker will return to step 84 and input new keywords. When a job seeker selects a job listing/employer at step 92, above-described Event 1 will have occurred, generating a specific number of points for the job listing/employer. At step 94, by selecting a job listing, the job seeker will be able to view the employers profile and job listing, specifically the custom home page 38. At step 96, the job seeker must make a decision as to whether they wish to apply for the job listing with the employer. If the job seeker decides to initiate contact, then at step 98, above-described Event 2 will have occurred, generating a specific number of points for the employer/job listing, however, if the job seeker decides not to initiate contact, then the job seeker will return to step 84 to input new keywords for another search.

Figure 9:
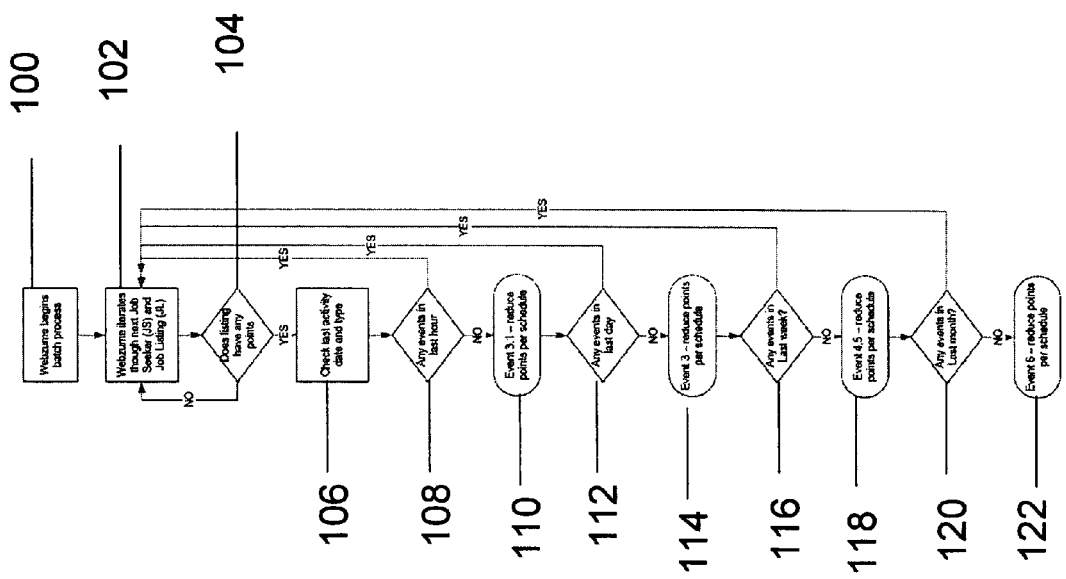
FIG. 9 is a process flow diagram illustrating how ranking for both job listings and job seekers in the current system are automatically maintained.

FIG. 9 illustrates a process flow chart for automatically updating the rankings of both job seekers and job listings/employers by determining the amount of points they have generate. In general, this process ensures that any ranking score of either a job seeker or job listing is accurate at the time of viewing by systematically reducing scores based on certain periods of inactivity and thus reducing scores accordingly.

Initially, at step 100, the system of the instant invention begins the batch process for updating the rankings of both job seekers and job listings/employers. Once the system begins the batch process, at step 102 the system iterates through the first job seeker and job listing. At step 104, the system determines whether the listing, being a job seeker or employer/job listing has any points. If the listing possesses no points, then the system returns to step 102 and moves on to the next listing. If the listing possesses any points at step 104, then the system determines at step 106 when the date and type of last activity was for the listing that is currently being reviewed. If their has been activity in the last hour with the listing at step 108, then the system returns to step 102 and moves on to the next listing. However, if no activity was detected in the last hour, then at step 110, the system subtracts points from the listing. The system then determines at step 112 if there has been any activity with the listing in the past day, if there has been, the system returns to step 102 and moves on to the next listing. However, if no activity was detected in the last day, then at step 112, Event 3 is triggered, and the system subtracts points from the listing at step 114. The system then determines at step 116 if there has been any activity with the listing in the past week, if there has been, the system returns to step 102 and moves on to the next listing. However, if no activity was detected in the last week, then at step 118, Event 4 and/or Event 5 is triggered, and the system subtracts points from the listing. The system then determines at step 120 if there has been any activity with the listing in the past month, if there has been, the system returns to step 102 and moves on to the next listing. However, if no activity was detected in the last month, then at step 122, Event 6 is triggered, and the system subtracts points from the listing.

Figure 10:
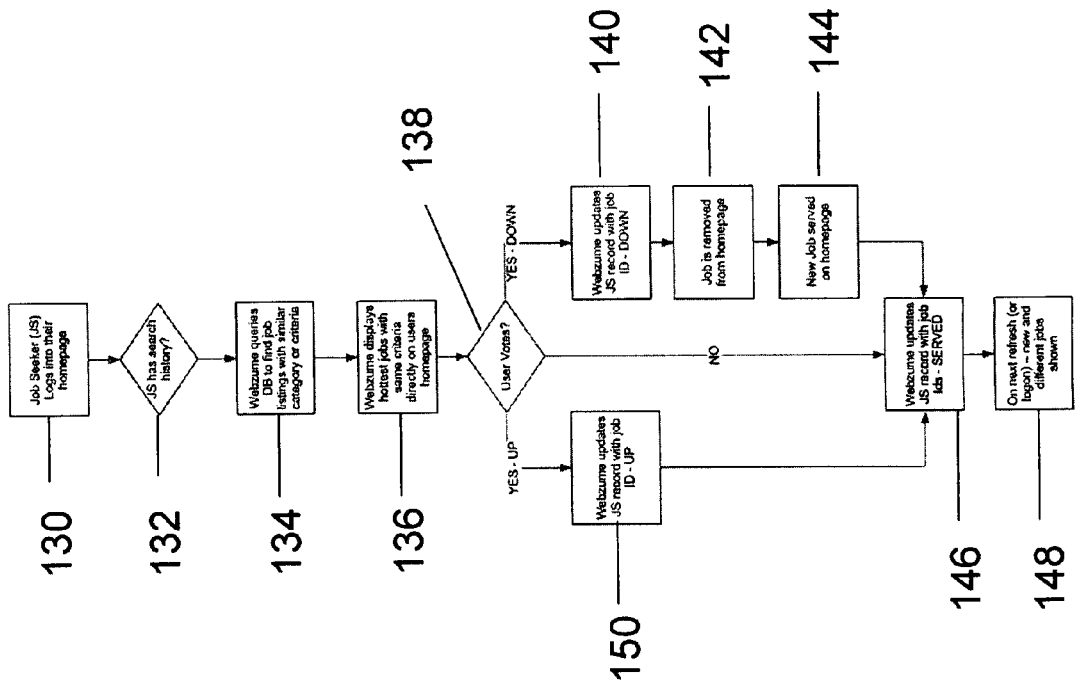
FIG. 10 is a process flow diagram illustrating how job seekers are automatically matched with job listings, and subsequently how they are displayed.

FIG. 10 illustrates a process system flowchart for automatically matching job seekers with job listings which would appear oh their personal home page 22 after being logged into the system, but prior to conducting their own search. At step 130, the job seeker logs into the system to access their personal home page 22. At step 132, the system determines whether the job seeker has searched the employer/job listing database in past instances when the job seeker has accessed the system. If the job seeker has conducted prior searches, the system at step 134 queries the employer/job listing database to locate job listings with similar keywords and categories as past searches the job seeker has conducted. After searching the employer/job listing database, at step 136, the system displays all "HOT" job listings/employers on the job seekers personal home page 22. Once the job listings/employers are displayed for the job seeker to view on their personal home page 22, the job seeker must decide at step 138, whether to vote the up or down, to signify whether the job listing is a close match. If the job seeker votes down the job, then at step 140, the system will update the job seeker's records to indicate that the job seeker is not interested in the opportunity. At step 142, the system removes the job listing from the job seekers personal home page 22 and replaces it with a new job listing at step 144 based on similar keywords of past searches by the job seeker. Once a new job is placed on the personal home 22 at step 144, the system updates the job seekers records at step 146 with the new job listing. Finally at step 148, when the job seeker logs into the system again, a plurality of new and different jobs will be displayed on the job seeker's personal home page 22. However, if the job seeker votes up the job listing, then at step 150, the system will update the job seeker's records to indicate that the job seeker is interested in the opportunity, after which the process will proceed to step 146.

Figure 11:
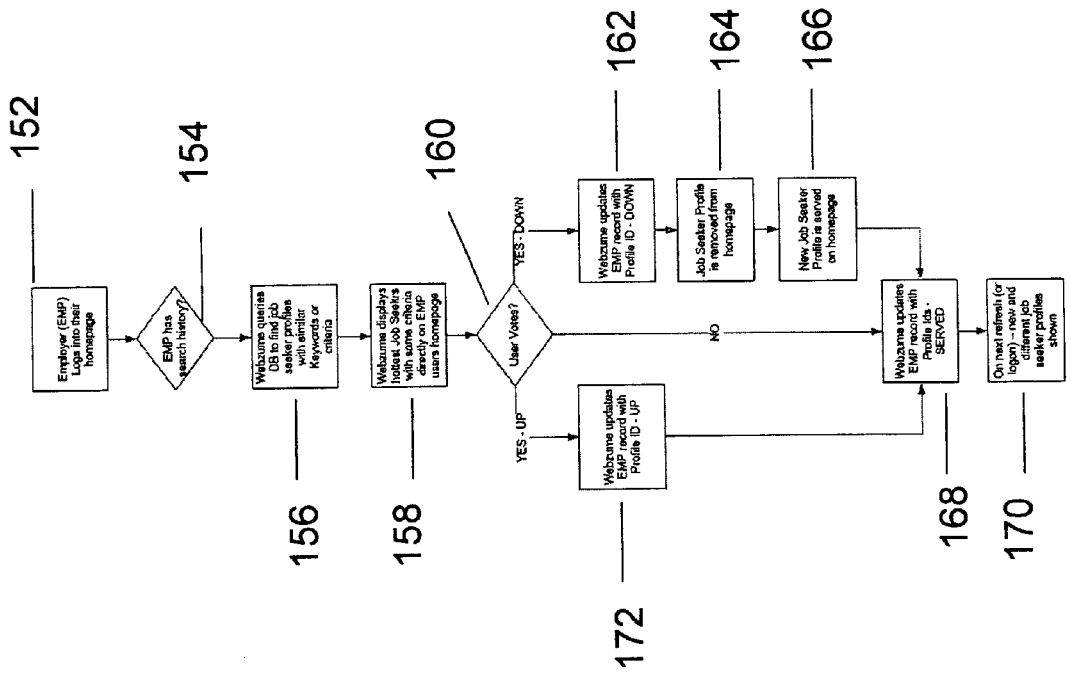
FIG. 11 is a process flow diagram illustrating how employers are automatically matched with job seekers, and subsequently how they are displayed.

FIG. 11 illustrates a process system flowchart for automatically matching employers with job seekers which would appear on their personal home page 38 after being logged into the system, but prior to conducting their own search. At step 152, the employer logs into the system to access their personal home page 38. At step 154, the system determines whether the employer has searched the job seeker database in past instances when the employer has accessed the system. If the employer has conducted prior searches, the system at step 156 queries the job seeker database to locate job seekers with similar keywords and categories as past searches the job seeker has conducted. After searching the job seeker database, at step 158, the system displays all "HOT" job seekers on the employer's personal home page 38. Once the job seekers are displayed for the employers to view on their personal home page 38, the employer must decide at step 160, whether to vote the up or down, to signify whether the job seeker is a close match. If the employer votes down the job seeker, then at step 162, the system will update the employer's records to indicate that the employer is not interested in the job seeker. At step 164, the system removes the job seeker from the employer's personal home page 38 and replaces it with a new job seeker at step 166 based on similar keywords of past searches by the employer. Once a new job is placed on the personal home 38 at step 166, the system updates the employer's records at step 168 with the new job seeker. Finally at step 170, when the job seeker logs into the system again, a plurality of new and different jobs will be displayed on the job seeker's personal home page 38. However, if the employer votes up the job seeker, then at step 172, the system will update the employer's records to indicate that the employer is interested in the job seeker, after which the process will proceed to step 168.

Figure 12:
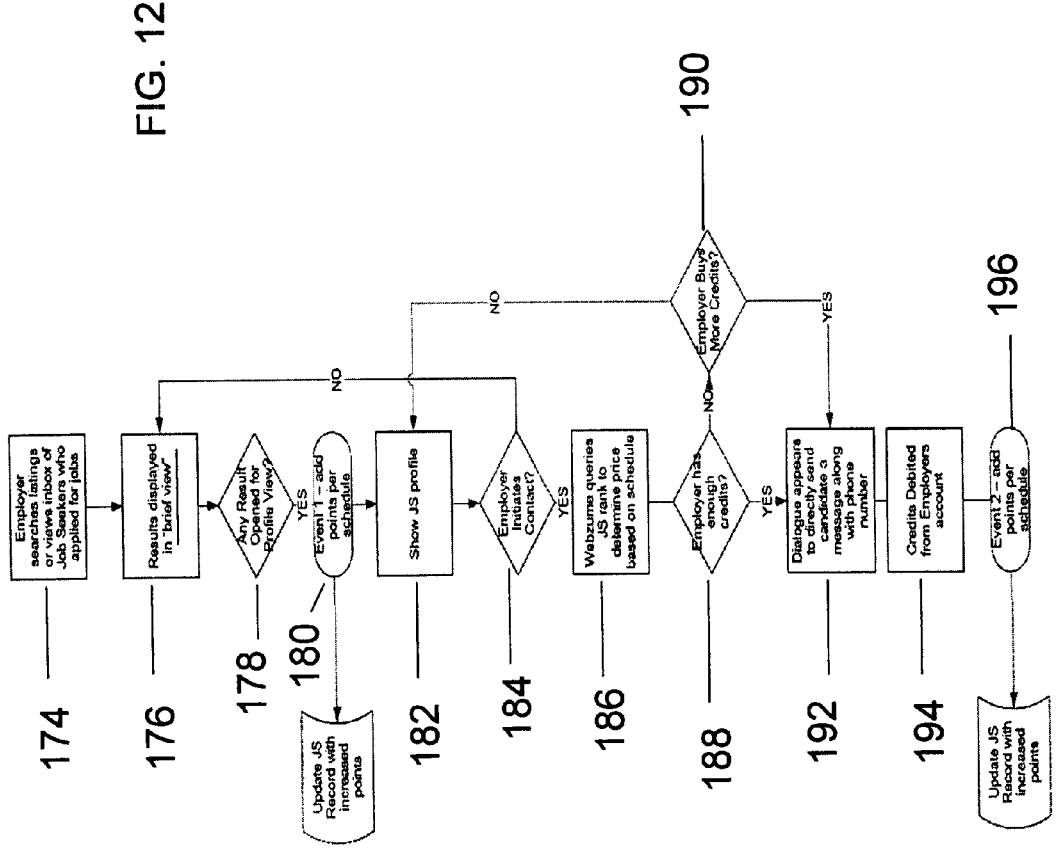
FIG. 12 is a process flow diagram illustrating how the system determines pricing for charging employers for the right to contact a particular job seeker.

FIG. 12 illustrates a process flow chart detailing how employers will be charged for contacting job seekers. In general, this process determines a price to charge employers for the right to contact a job seeker. This fee is based on a sliding schedule, which takes into account a job seekers rank and location to determine price.

Currently most job searching websites charge employers two different prices: one price to post a job listing and a second price to search the job seekers database (and usually employers are restricted to searching the database in a specific region, category and the amount of time for viewing).

The instant invention encompasses a system, wherein employers will pay a small fee to post jobs, preferably between ten dollars and fifty dollars, and then pay-per-contact for job seekers they are interested in communicating and speaking with. Therefore, rather than having employers paying a single price to gain access to the job seeker database, employers will only have to pay to view job seekers they are interested in contacting. As a result, employers may search the system at no charge by viewing brief excerpts about job seekers without actually viewing the job seekers contact information. Thus, when an employer desires to see more detailed information about the job seeker for a certain fee.

Finally, in the instant invention, there will be no set price for employers who wish to view a specific job seeker, rather the price will be determine by the rank and activity for the specific job seeker, wherein "HOT" job seekers will cost more for employers than those with less activity. Therefore, highly desired job seekers with outstanding resume and experience will demand a premium over less experienced job seekers or job markets that are not as active. This process ensures the employers receive better quality matches for less cost, and conversely that employees only receive job listings that are close to their experience and expectations.

At step 174, after an employer has logged into the system and accessed their personal home page 38, an employer can either conduct their own search of the job seeker database or view job seekers who have applied for a job listing posted by the employer. At step 176, the results of the search of the list of job seekers who applied for jobs are displayed in a brief view as described above. The employer must decide whether they wish to select one of the job seekers to view a more detailed profile at step 178. If the employer selects a job seeker to view in more detailed, then at step 180, above described Event 1 has occurred and the pre-determined amount of points will be added to the job seekers ranking. At step 182, the job seeker's profile will be displayed for the employer to view and the employer must determine at step 184 whether to initiate contact with the job seeker. If the employer chooses not to initiate contact, then the employer returns to step 176 to review the list of job seekers produced earlier. However, if the employer wishes to initiate contact, then at step 186 the system will determine the price the employer must pay to contact the job seeker based on the activity of the job seeker. At step 188, the employer determines whether they wish to pay the fee to contact the job seeker and if they possess enough money in their account. If the employer does not have enough money to speak with the job seeker, at step 190, the employer must decide whether to pay the additional money to speak with the job seeker. If the employer declines, then the employer will return to step 176, however if they wish to pay the additional money, at step 192 the employer will be prompted to directly send the job seeker a message that the employer is interested in speaking to them. If the employer does have enough money in their account to speak with the job seeker at step 188, then the employer will proceed directly to step 192. Once the employer has contacted the job seeker at step 192, the system will charge the employer at step 194 the price determined for the specific job seeker. At this point, Event 2 has occurred as described above, and at step 196, the system adds the predetermined amount of points to the job seekers rankings.

All of the above discussed operative features located either on the job seeker or employers personal homepage, along with each step in the above discussed process flow charts, can be assessed via or by way of tabs on the individual pages as claimed below.

We claim:

1. A method for facilitating online employment negotiations between employers and job seekers, wherein job seekers are ranked based on several decision events, with a first event adding to the total points and with a second event worth more than the first event, and wherein all job seekers are given a rank to be stored in a database as an integer number, wherein an employer completes the steps comprising:
- a) storing by a computer system, job seekers' initial rankings and job listings in a database;
- b) an employer logging into the system;
- c) inputting specific keywords that match the type of job seeker the employer wants for an available job listing;
- d) searching by the computer system, the database index for all job seekers that contain the specific keywords on their personal home page;
- e) displaying by the computer system a search results page;
- f) choosing a job seeker to view a more detailed description, wherein when the employer declines to choose at least one job seeker, the employer is returned to the search results page and wherein a predetermined amount of points are automatically added to the job seekers ranking in the computer system based on a first event occurring when the employer selects a more detailed description of the job seeker to view;
- g) viewing a job seekers profile by the employer to determine whether the job seeker is a match for the job listing by the employer; and
- h) initiating contact with the job seeker by the employer, wherein when the employer declines to initiate contact, the employer is returned to the search results page and wherein a predetermined amount of points are automatically added to the job seekers ranking in the computer system based on a second event occurring when the employer initiates contact with the job seeker.

2. The method for facilitating online negotiations between employers and job seekers of claim 1, wherein job listings by employers are ranked based on several decision events, with a first event adding to the total points and with a second event worth more than the first event, and wherein all job listings are given a rank to be stored in the database as an integer number, wherein the job seeker completes the steps comprising:
- a) storing by the computer system, job seekers' initial rankings in a database;
- b) a job seeker logging into the system;
- c) inputting specific keywords that match the type of job listing the job seeker is interested in pursuing;
- d) searching the database index for all job listing that contain the specific keywords listed on the employers personal home page;
- e) displaying by the computer system, a search results page;
- f) choosing a job listing to view a more detailed description, wherein when the job seeker declines to choose at least one job listing, the job seeker is returned to the search results page and wherein a predetermined amount of points are automatically added to the job listing's ranking in the computer system based on a first event occurring when the job seeker selects a more detailed description of the job listing to view;
- g) viewing a job listing/employer's profile by the job seeker to determine whether the job listing is a match for the job seeker;
- h) initiating contact with the employer, and wherein when the job seeker declines to initiate contact, the job seeker returns to the search results page and wherein a predetermined amount of points are automatically added to the job listing's ranking in the computer system based on a second event occurring when the job seeker initiates contact with the employer.

3. The method for facilitating online employment negotiations between employers and job seekers of claim 2, wherein the system automatically updates the rankings of both job seekers and job listings by determining the amount of points each has generated, thereby ensuring that the ranking of a job seeker and a job listing is accurate at the time of viewing, and wherein the system reduces each ranking based on periods of inactivity, the steps comprising:
- a) storing by the computer system, job seekers' initial rankings and job listings in a database;
- b) beginning the batching process for the system to update the rankings of job seekers and job listings;
- c) iterating through the first job seeker and first job listing in the system;
- d) determining whether the listing has any points, and when the listing possesses no points, then the system returns to the next listing;
- e) determining when the date and type of last activity was for the listing that is currently being reviewed; and where there has been activity in the last hour with the listing then the system moves on to the next listing and wherein a predetermined number of points are automatically subtracted from the listing in the computer system when no activity is detected in the last hour;
- f) determining whether there has been any activity with the listing in the past day, and where their has been activity in the last day, the system moves on to the next listing and wherein a predetermined number of points are automatically subtracted from the listing in the computer system when no activity is detected in the last day;
- g) determining whether there has been any activity with the listing in the past week, and where there has been, the system moves on to the next listing and wherein a predetermined number of points are automatically subtracted from the listing in the computer system when no activity is detected in the last week;
- h) determining whether there has been any activity with the listing in the past month, and where there has been activity, the system moves on to the next listing and wherein a predetermined number of points are automatically subtracted from the listing in the computer system when no activity is detected in the last month; and
- i) forwarding the updated ranking to a database for user access.

4. The method for facilitating online employment negotiations between employers and job seekers of claim 3 wherein the system automatically matches job seekers with job listings that appear on the job seekers personal home page after being logged into the system, but prior to conducting the job seekers own search, the steps comprising;
- a) logging into the computer system by a job seeker to access their personal home page;
- b) determining whether the job seeker has searched the job listing database when the job seeker has previously accessed the system;
- c) querying the job listing database to identify job listings containing similar keywords and categories to past searches of the job seeker;
- d) searching the job listing database;
- e) displaying all "HOT" job listings on the job seekers personal home page; and
- f) voting on the job listing by the job seeker, and where the job listing is voted down, the system will automatically update the job seeker's records to indicate that the job seeker is not interested in the opportunity, and removes the job listing from the job seekers personal home page, and where the job listing is voted up, the system will automatically update the job seeker's records to indicate that the job seeker is interested in the opportunity.

5. The method for facilitating online employment negotiations between employers and job seekers of claim 4 wherein the system automatically matches employers with job seekers that appear on the employers personal home page after being logged into the system, but prior to conducting the employers own search, the steps comprising;
   a) logging into the computer system by an employer to access their personal home page;
   b) determining whether the employer has searched the job seeker database when the employer has previously accessed the system;
   c) querying the job seeker database to identify job listings containing similar keywords and categories to past searches of the employer;
   d) searching the job seeker database;
   e) displaying all "HOT" job seekers on the employers personal home page; and
   f) voting on the job seeker by the employer, and where the job seeker is voted down, the system will automatically update the employers records to indicate that the employer is not interested in the job seeker, and removes the job seeker from the employers personal home page, and where the job seeker is voted up, the system will update the employers records to indicate that the employer is interested in the job seeker.

6. The method for facilitating online employment negotiations between employers and job seekers of claim 5, wherein the system automatically determines an individual price for each job seeker the employer wishes to initiate contact with, based on the activity of the job seeker, the steps comprising:
   a) logging into the computer system by the employer and accessing the employers personal home page;
   b) conducting a search of the job seeker database by the employer;
   c) displaying by the system a search results page based on the keywords entered by the employer;
   d) viewing the search results page by the employer to determine whether a job seeker matches the employers needs;
   e) deciding by the employer whether to select a more detailed profile of a job seeker, and where the employer declines to select one of the job seekers, the computer system automatically returns the employer to the search results page;
   f) selecting a job seeker to view in more detail, and wherein a pre-determined amount of points are automatically added to the job seekers ranking by the system;
   g) displaying the job seekers profile for the employer to view;
   h) determining whether to initiate contact with the job seeker, and where the employer chooses not to initiate contact, then the computer system automatically returns the employer to the search results page; and
   i) initiating contact with the job seeker by the employer, and wherein the system automatically determines the price the employer must pay to contact the job seeker based on the activity of the job seeker.

\* \* \* \* \*